United States Patent
Reilly et al.

(10) Patent No.: US 10,817,813 B2
(45) Date of Patent: Oct. 27, 2020

(54) RESOURCE CONFIGURATION AND MANAGEMENT SYSTEM

(71) Applicant: Qlytics LLC, New York, NY (US)

(72) Inventors: Brendan Reilly, Westport, CT (US); Marco Buchbinder, Weston, MA (US)

(73) Assignee: Qlytics LLC, New York, NY (US)

( * ) Notice: Subject to any disclaimer, the term of this patent is extended or adjusted under 35 U.S.C. 154(b) by 0 days.

(21) Appl. No.: 16/663,889

(22) Filed: Oct. 25, 2019

(65) Prior Publication Data

US 2020/0134564 A1   Apr. 30, 2020

Related U.S. Application Data

(60) Provisional application No. 62/750,682, filed on Oct. 25, 2018.

(51) Int. Cl.
| | |
|---|---|
| *G06F 9/44* | (2018.01) |
| *G06Q 10/06* | (2012.01) |
| *G06Q 10/10* | (2012.01) |
| *G06N 3/08* | (2006.01) |
| *G06F 9/451* | (2018.01) |
| *G06F 8/10* | (2018.01) |
| *G06F 9/50* | (2006.01) |

(Continued)

(52) U.S. Cl.
CPC ....... *G06Q 10/063112* (2013.01); *G06F 8/10* (2013.01); *G06F 9/451* (2018.02); *G06F 9/50* (2013.01); *G06N 3/08* (2013.01); *G06Q 10/063114* (2013.01); *G06Q 10/103* (2013.01); *G06F 11/368* (2013.01); *G06F 2221/2149* (2013.01); *G06Q 20/10* (2013.01)

(58) Field of Classification Search
CPC .................... G06Q 10/063112; G06F 8/30
USPC .......................................................... 717/101
See application file for complete search history.

(56) References Cited

U.S. PATENT DOCUMENTS

| | | | |
|---|---|---|---|
| 6,289,340 B1 | 9/2001 | Puram et al. | |
| 8,180,780 B2 * | 5/2012 | Herness | G06Q 10/06 707/748 |

(Continued)

OTHER PUBLICATIONS

Carl Boettiger et al.; "An Introduction to Rocker: Docker Containers for R"; Arxiv—Oct. 2017.*

(Continued)

*Primary Examiner* — Francisco J Aponte
(74) *Attorney, Agent, or Firm* — Rowan TELS LLC

(57) ABSTRACT

A method of operating a resource configuration and project management system involves identifying, for a project, sandboxed task data and task parameters including project skill sets and project tools. The method configures a first selector with project skill sets to select at least one developer from a developer pool. The method configures a second selector with project tools to select at least one container including at least one set of programming functions from a container library. The method assigns at least one developer to a working task queue generated from the task parameters. The method configures the at least one container to operate as a sandboxed environment. The method authorizes the at least one developer to access the at least one container and the sandboxed task data within the sandboxed environment. The method monitors developer resources and computing resources during execution of the project by the selected at least one.

18 Claims, 13 Drawing Sheets

(51) Int. Cl.
*G06Q 20/10* (2012.01)
*G06F 11/36* (2006.01)

(56) References Cited

U.S. PATENT DOCUMENTS

| | | | | |
|---|---|---|---|---|
| 8,499,278 | B2* | 7/2013 | Hughes | G06F 8/20 |
| | | | | 717/101 |
| 8,856,725 | B1* | 10/2014 | Anderson | G06F 8/75 |
| | | | | 717/103 |
| 9,098,803 | B1 | 8/2015 | Todd et al. | |
| 9,304,760 | B2* | 4/2016 | Hey, Jr. | G06Q 10/063112 |
| 9,305,279 | B1* | 4/2016 | Menzel | G06Q 10/06398 |
| 9,619,211 | B2* | 4/2017 | McCollum | G06F 8/33 |
| 9,645,817 | B1* | 5/2017 | van Schaik | G06F 11/3604 |
| 9,652,224 | B2* | 5/2017 | Hey | G06Q 10/063112 |
| 9,720,683 | B2* | 8/2017 | Craig | G06F 8/71 |
| 9,785,432 | B1* | 10/2017 | Wright | G06Q 10/06398 |
| 9,799,007 | B2* | 10/2017 | Blincoe | G06Q 10/101 |
| 9,851,968 | B2* | 12/2017 | Straub | G06F 8/71 |
| 9,959,100 | B2* | 5/2018 | Straub | G06F 8/36 |
| 10,248,919 | B2* | 4/2019 | Shuster | G06Q 10/06311 |
| 10,423,916 | B1* | 9/2019 | Cohen | G06Q 10/06398 |
| 2006/0053043 | A1 | 3/2006 | Clarke | |
| 2006/0277528 | A1 | 12/2006 | Chen et al. | |
| 2008/0313595 | A1* | 12/2008 | Boulineau | G06F 8/20 |
| | | | | 717/101 |
| 2009/0012833 | A1* | 1/2009 | Kuhlke | G06Q 10/06 |
| | | | | 705/7.14 |
| 2011/0219353 | A1 | 9/2011 | Simpson et al. | |
| 2011/0252394 | A1* | 10/2011 | Sharma | G06F 11/3616 |
| | | | | 717/101 |
| 2014/0089027 | A1* | 3/2014 | Brown | G06Q 10/06311 |
| | | | | 705/7.15 |
| 2014/0137074 | A1* | 5/2014 | Hey | G06F 8/70 |
| | | | | 717/101 |
| 2014/0369597 | A1* | 12/2014 | Shulman | G06K 9/6254 |
| | | | | 382/159 |
| 2015/0081363 | A1* | 3/2015 | Taylor | G06Q 40/00 |
| | | | | 705/7.14 |
| 2016/0004517 | A1* | 1/2016 | Safary | G06F 8/436 |
| | | | | 717/131 |
| 2017/0048339 | A1* | 2/2017 | Straub | G06F 16/2379 |
| 2017/0180413 | A1* | 6/2017 | Petry | H04L 63/0209 |
| 2018/0060744 | A1* | 3/2018 | Achin | G06F 9/5011 |
| 2018/0210709 | A1* | 7/2018 | Bharthulwar | G06F 8/24 |
| 2018/0349108 | A1* | 12/2018 | Brebner | G06F 8/41 |
| 2018/0357047 | A1* | 12/2018 | Brown | G06K 9/00973 |
| 2018/0357114 | A1* | 12/2018 | O'Kennedy | G06F 9/541 |
| 2019/0004791 | A1* | 1/2019 | Brebner | G06F 8/315 |
| 2019/0020698 | A1* | 1/2019 | Tripepi | H04L 67/1097 |
| 2019/0227793 | A1* | 7/2019 | Ramasamy | G06Q 10/06398 |
| 2019/0332366 | A1* | 10/2019 | Natanzon | G06F 11/36 |

OTHER PUBLICATIONS

International Search Report for PCT Application PCT/US2019/058159, dated Jan. 17, 2020.
International Written Opinion for PCT Application PCT/US2019/058159, dated Jan. 17, 2020.
Shrutika Purohit, "6 Essential Roles in Project Management." Sep. 22, 2018 (Sep. 22, 2018) In: eLearning Industry, Retrieved on Dec. 16, 2019 (Dec. 16, 2019) From entire document.

* cited by examiner

RESOURCE CONFIGURATION AND MANAGEMENT SYSTEM

CROSS-REFERENCE TO RELATED APPLICATIONS

This application claims the benefit of U.S. provisional patent application Ser. No. 62/750,682, filed on Oct. 25, 2018, the contents of which are incorporated herein by reference in their entirety.

BACKGROUND

Implementation of Artificial Intelligence (AI)/Machine Learning is becoming a critical component in many business infrastructures for data handling and analytics. Unfortunately, the adoption of many of these algorithms has been slowed in the enterprise world due to several challenges. Some of these challenges may be due to the current open source AI software lacking enterprise level security, testing, and support.

Another challenge may be due to the massive amounts of data that are needed to train and feed AI algorithms since data is typically "dirty", unaligned and hard to source and collect. Another impediment for adoption is due to the scarcity of skilled AI developers which are expensive and hard to retain on different AI systems. Therefore, a need exists for improving adoption of AI/Machine Learning algorithms in an enterprise environment.

BRIEF SUMMARY

A method of operating a resource configuration and project management system involves identifying, for a project, sandboxed task data and task parameters comprising project skill sets and project tools. The method configures a first selector with the project skill sets to select at least one developer from a developer pool. The method configures a second selector with the project tools to select at least one container comprising at least one set of programming functions from a container library. The method assigns the selected at least one developer to a working task queue generated from the task parameters. The method may configure the selected at least one container to operate as a sandboxed environment with the sandboxed task data. The method authorizes the selected at least one developer to access the selected at least one container and the sandboxed task data within the sandboxed environment through operation of an authorization service. The method monitors sandboxed environment developer resources and sandboxed environment computing resources during execution of the project by the selected at least one developer through operation of a monitoring service.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a routine in accordance with one embodiment.

Figure 3:
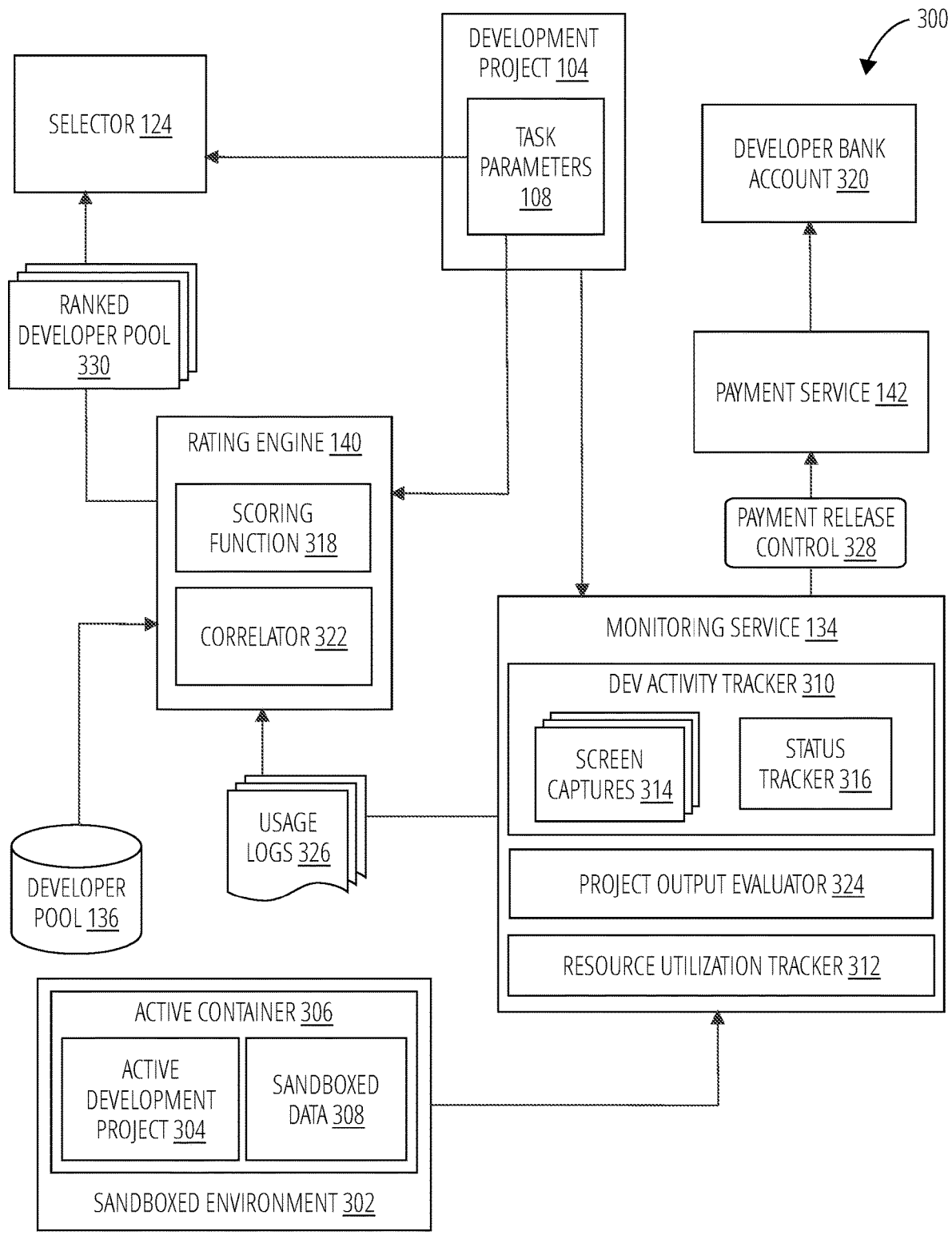

FIG. 3 illustrates a system 300 in accordance with one embodiment.

Figure 4:
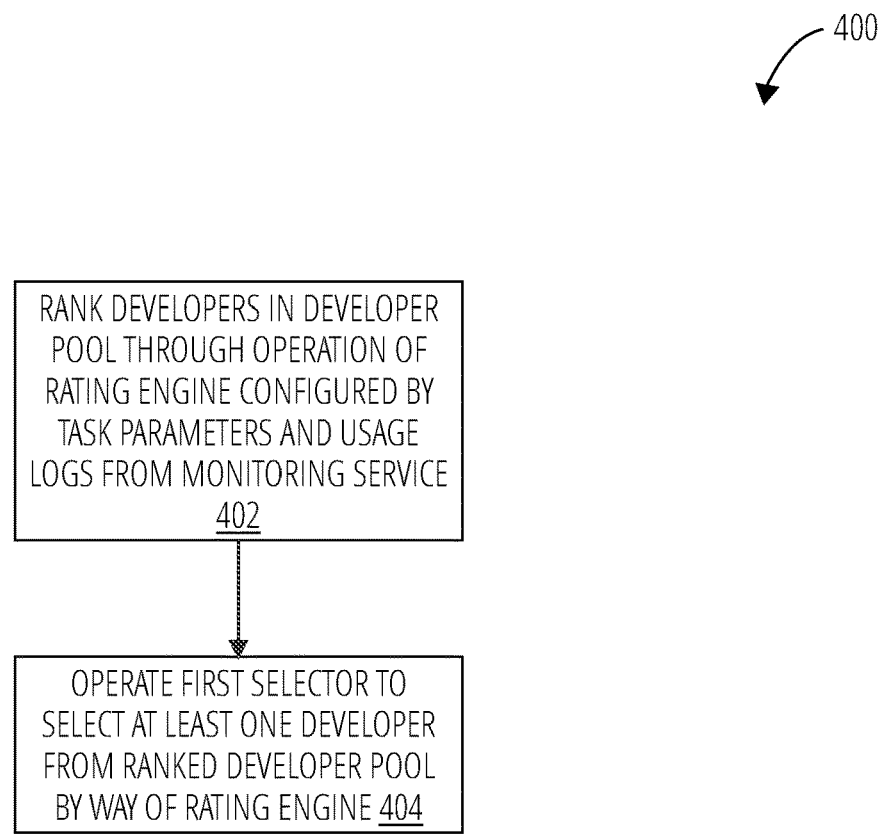

FIG. 4 illustrates a method 400 in accordance with one embodiment.

Figure 5:
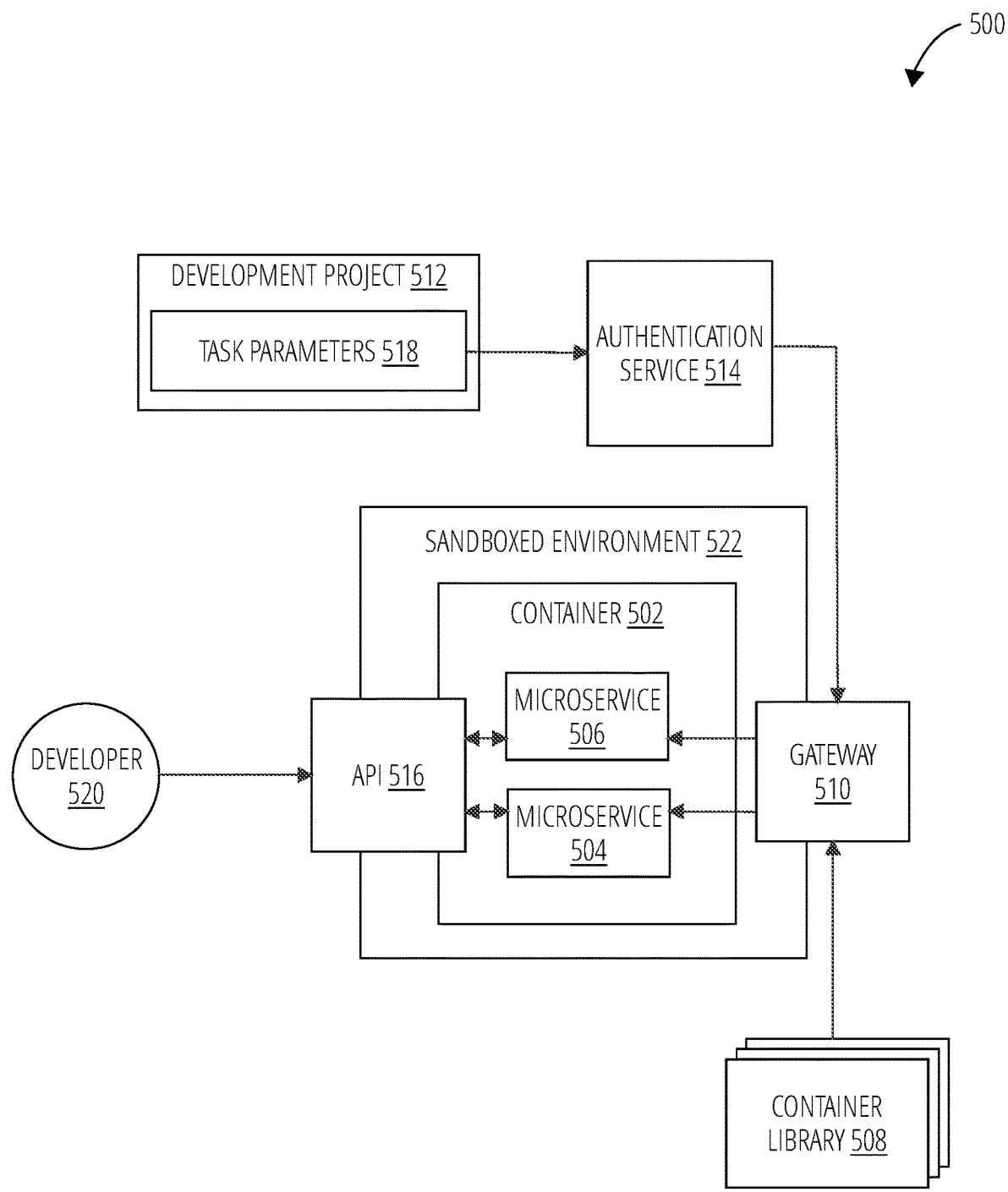

FIG. 5 illustrates a system 500 in accordance with one embodiment.

Figure 6:
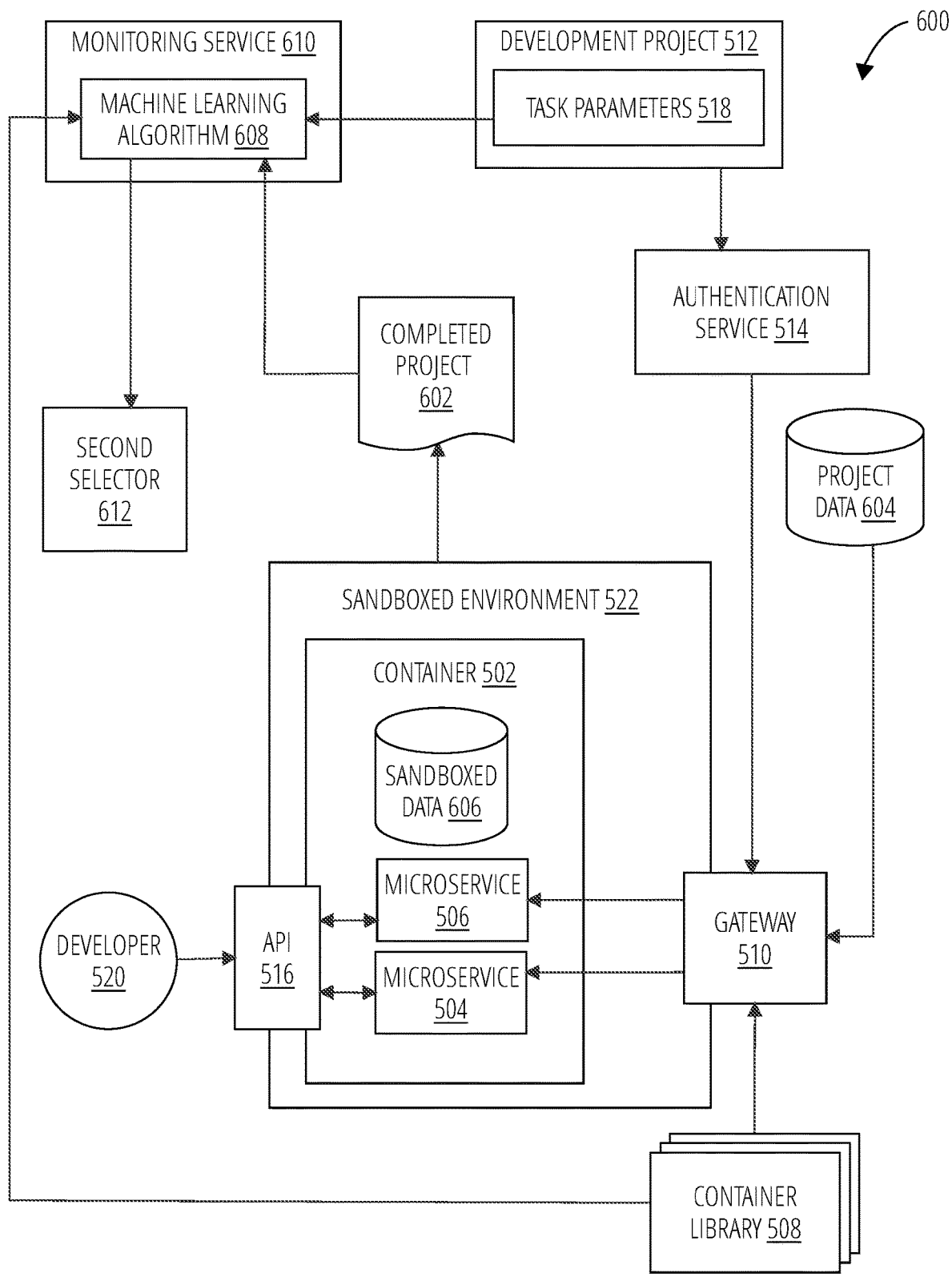

FIG. 6 illustrates a system 600 in accordance with one embodiment.

Figure 7:
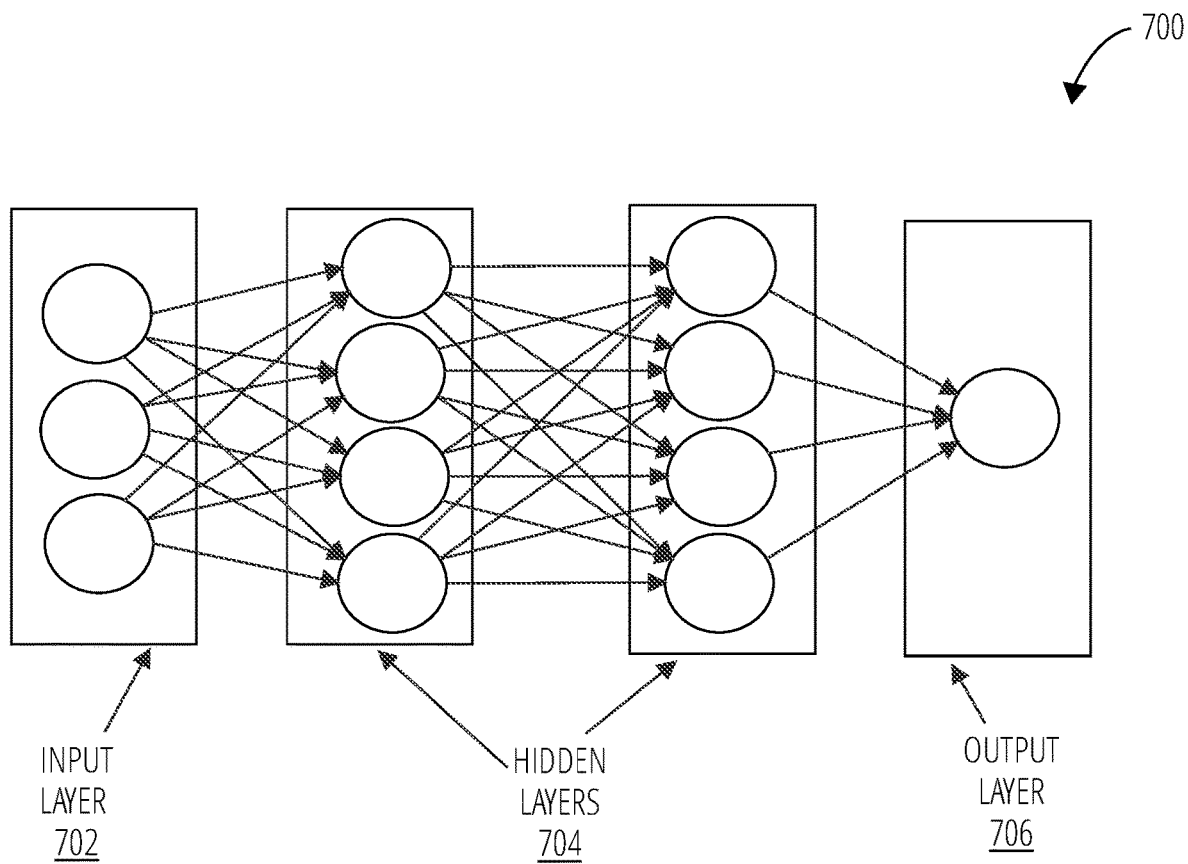

FIG. 7 illustrates a basic deep neural network 700 in accordance with one embodiment.

Figure 8:
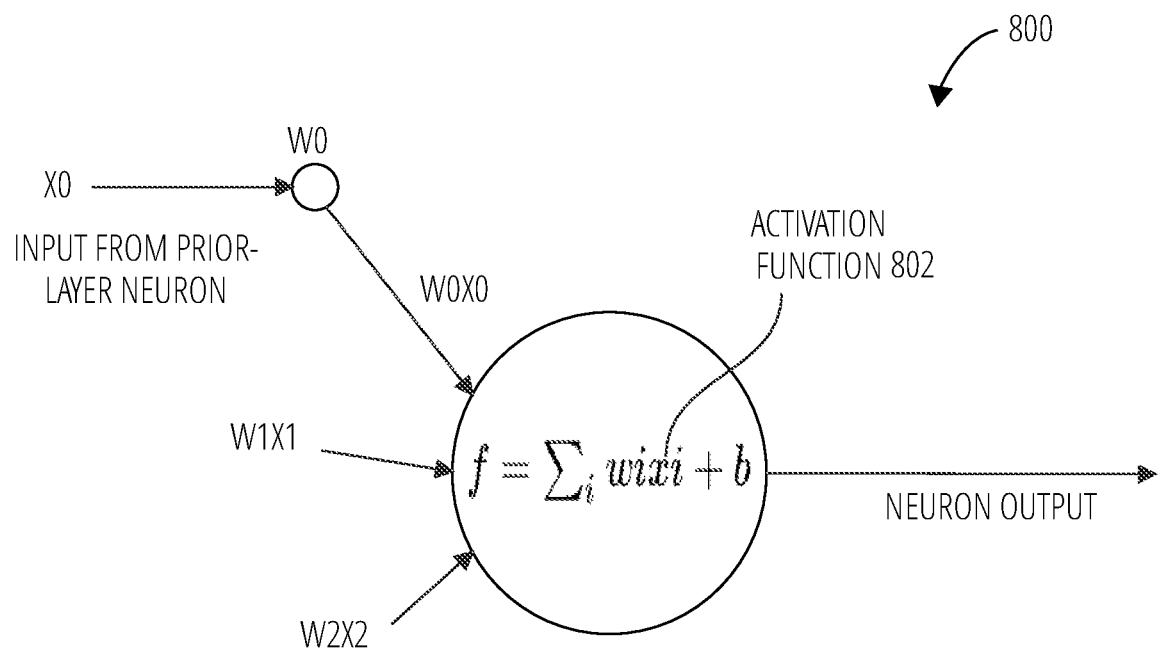

FIG. 8 illustrates an artificial neuron 800 in accordance with one embodiment.

Figure 9:
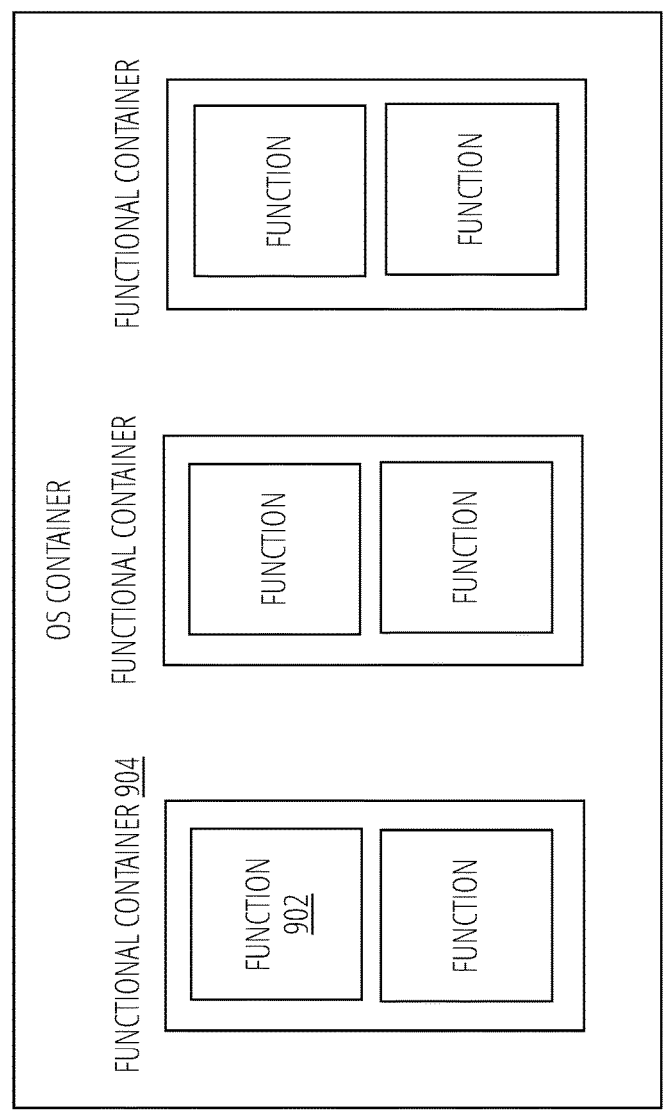

FIG. 9 illustrates an OS container 900 in accordance with one embodiment.

Figure 10:
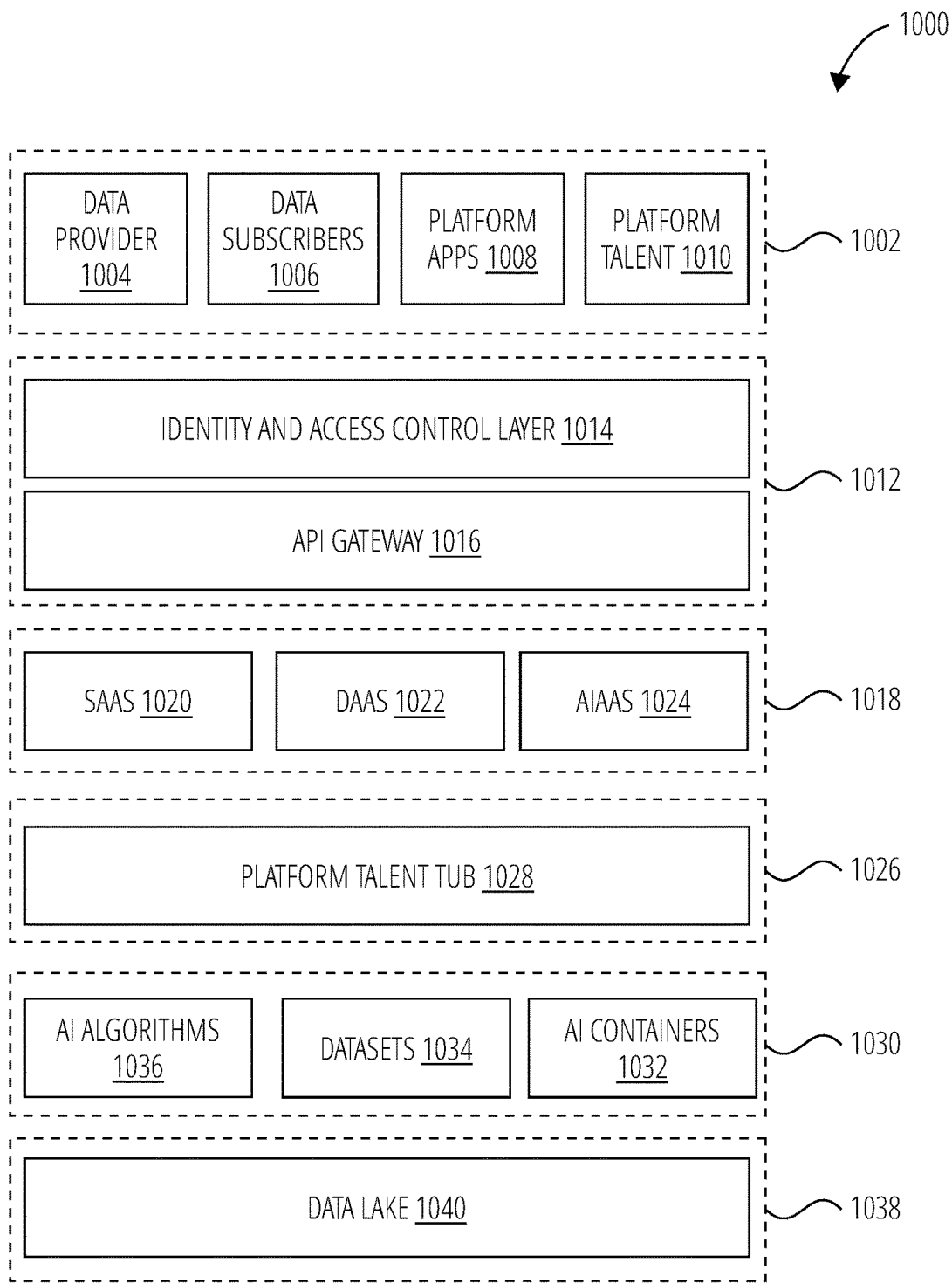

FIG. 10 illustrates a high-level architecture 1000 in accordance with one embodiment.

Figure 11:
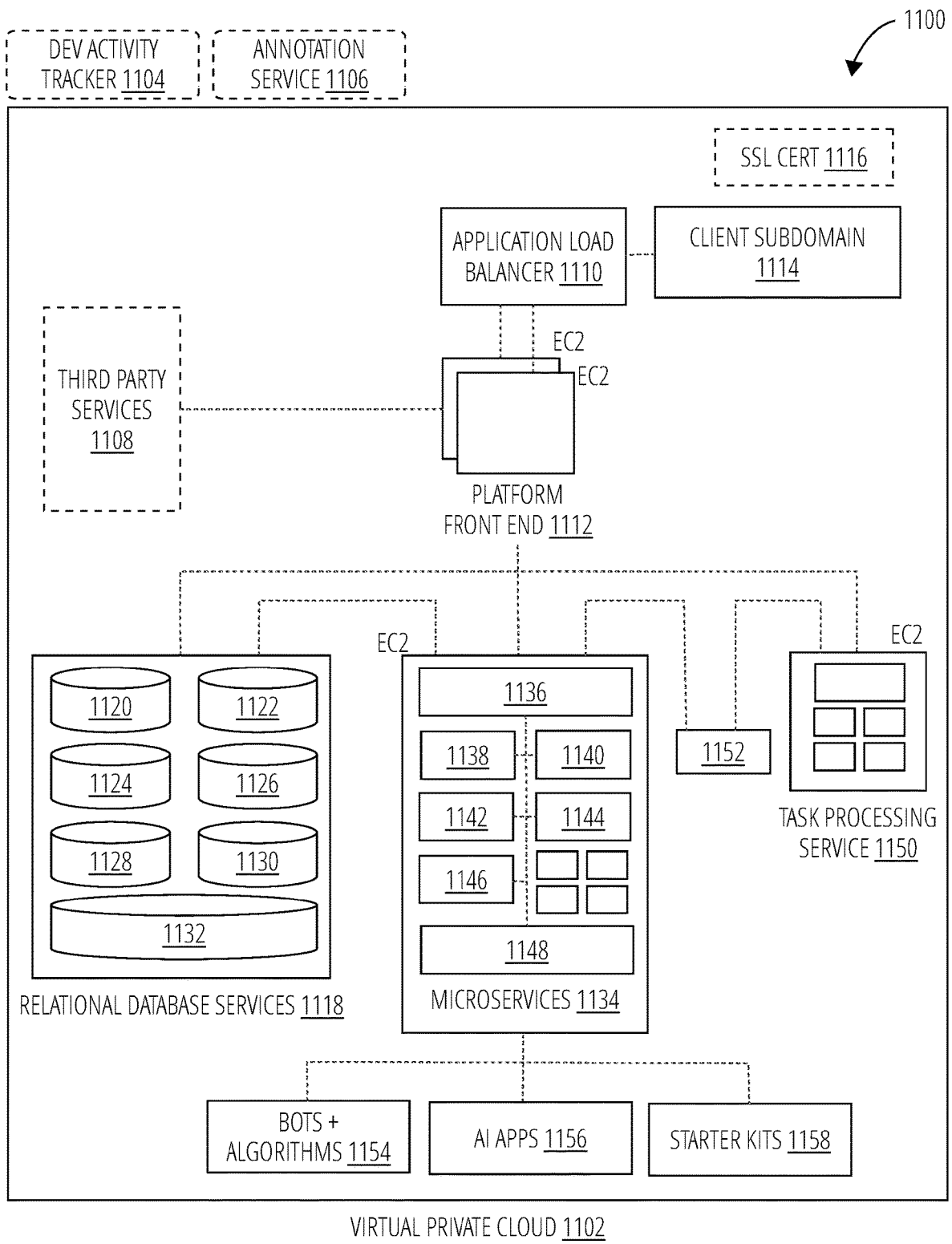

FIG. 11 illustrates a platform architecture 1100 in accordance with one embodiment.

Figure 12:
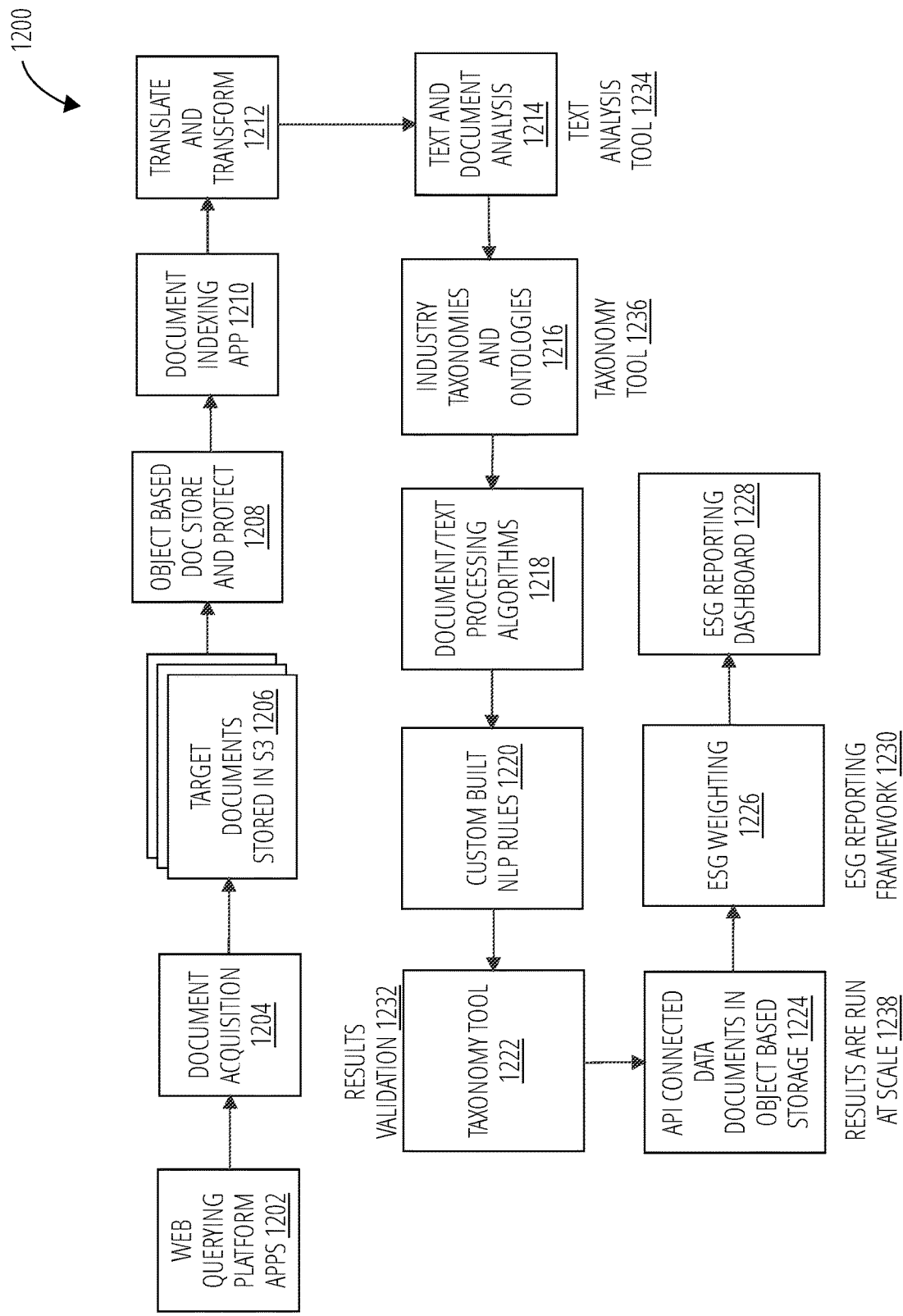

FIG. 12 illustrates a workflow 1200 in accordance with one embodiment.

Figure 13:
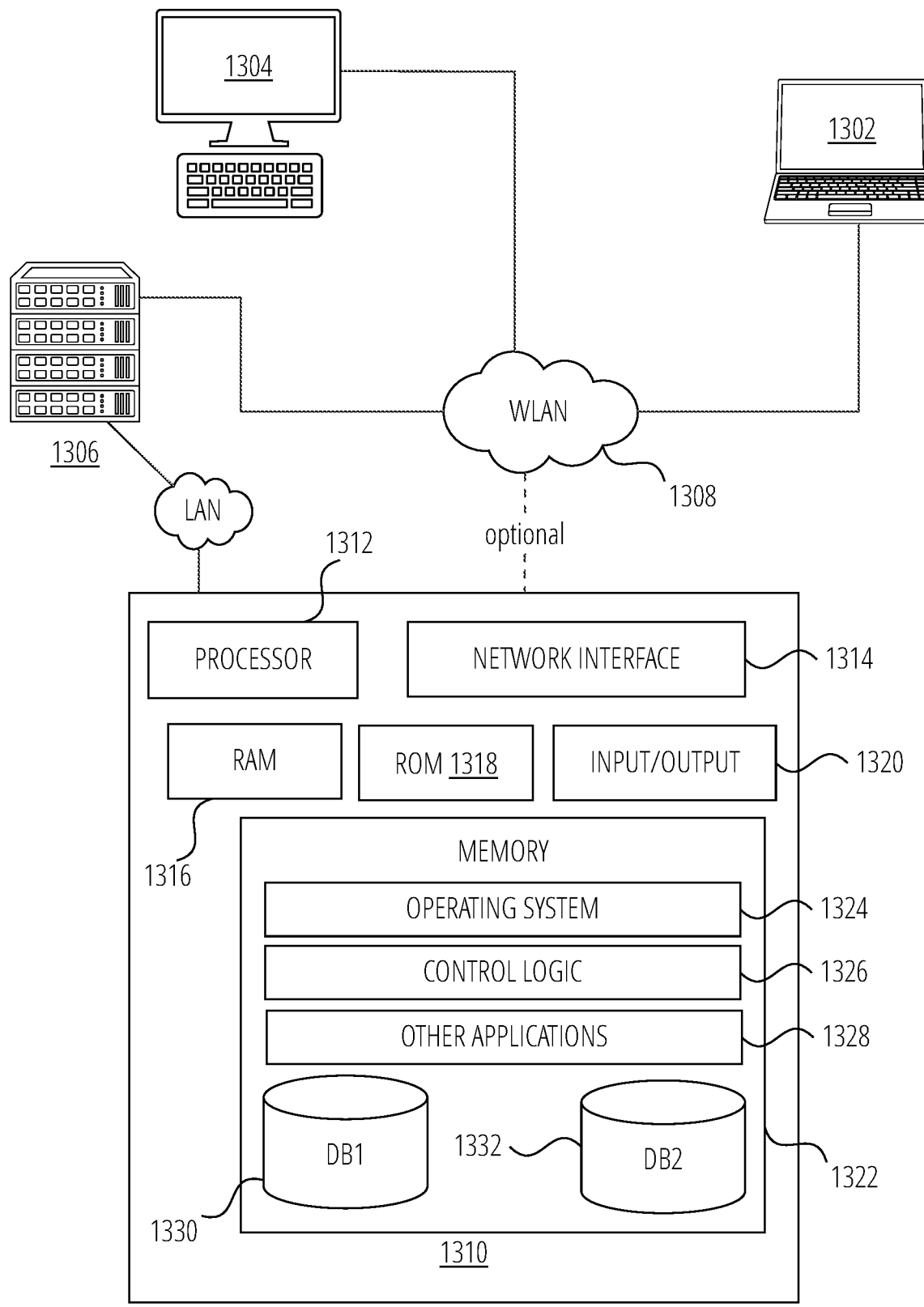

FIG. 13 depicts an illustrative computer system architecture that may be used in accordance with one or more illustrative aspects described herein.

DETAILED DESCRIPTION

"Container" refers to a storage location for data.

"Developer pool" refers to a group of developers.

"Developers" refers to people with skills to develop software related projects and products.

"First selector" refers to logic for selecting a specific set of data from a larger set of data.

"Project skill sets" refers to required abilities of a developer to perform a project.

"Sandboxed environment" refers to a testing environment that isolates untested code changes and experimentation from the production environment or repository.

"Sandboxed task data" refers to for a particular project, project skill sets and/or project tools.

"Second selector" refers to logic for selecting a specific set of data from a larger set of data.

"Task parameters" refers to for a particular project, project skill sets and/or project tools.

"Working task queue" refers to a list of tasks that are scheduled to be performed or are in progress.

The disclosure is generally directed to a method of operating a resource configuration and project management system, which involves identifying, for a project, sandboxed task data and task parameters including project skill sets and project tools.

The method configures a first selector with the project skill sets to select at least one developer from a developer pool. The method also configures a second selector with the project tools to select at least one container comprising at least one set of programming functions from a container library. Next, the method assigns the selected at least one developer to a working task queue generated from the task parameters. The selected at least one container may be configured to operate as a sandboxed environment with the sandboxed task data.

The selected at least one developer may be authorized to access the selected at least one container and the sandboxed task data within the sandboxed environment through operation of an authorization service. The method also monitors sandboxed environment developer resources and sandboxed environment computing resources during execution of the project by the selected at least one developer through operation of a monitoring service.

In some configurations, the monitoring service may include a developer activity tracker, a resource utilization tracker, and a project output evaluator. The developer activity tracker periodically may collect screen captures of the at least one developer's user interface as part of monitoring the sandboxed environment developer resources. The resource utilization tracker may monitor the sandboxed environment computing resources of the selected at least one container. The project output evaluator may communicate a payment release control to a payment service in response to detecting a completed project.

In some instances, the method may rank developers in the developer pool through operation of a rating engine configured by the task parameters and usage logs from the monitoring service, wherein the usage logs comprise the sandboxed environment developer resources and the sandboxed environment computing resources collected by the monitoring service. The method may operate the first selector to select the at least one developer from a ranked developer pool by way of the rating engine. In some configurations, the rating engine may include a correlator for relating the usage logs to corresponding developers and a scoring function to generate a developer score from the usage logs for the project.

In some configurations, the at least one container may be an operating system container comprising at least one functional container comprising the at least one set of programming functions.

In some configurations, the selected at least one developer may access the selected at least one container through an API gateway.

In some configurations, the authorization service is configured to allocate computing resources for the selected at least one container through an API gateway.

In some configurations, the sandboxed task data and the task parameters are identified from a development project specification through operation of a parser. In some instances, the development project specification is received through a user interface.

In some configurations, the monitoring service comprises a machine learning algorithm. The machine learning algorithm may generate container recommendations to configure the second selector to select at functional containers to be utilized by the project, wherein the machine learning algorithm utilize the task parameters, previous completed projects, and usage logs to generate the container recommendations. In some configurations, the machine learning algorithm is a deep learning neural network.

In some configurations, the selected at least one developer has access to automation and analysis tools for use within the sandboxed environment.

In one embodiment, implementation of a resource configuration and management system may be demonstrated in a service platform. The service platform is a secure, cloud-based, AI-as-a-service platform that delivers immediate and scalable access to the API connected datasets, expert AI talent, collaboration & project management tools, and machine & deep learning algorithms necessary to AI enable applications, business processes and corporate enterprises. The service platform service is a human-assisted AI-as-a-service platform that delivers machine learning and deep learning based solutions and industry focused platform based software applications from a secure cloud-based platform. The service platform leverages advanced open-source AI tools and libraries, platform certified AI developers, API connected data and microservices, and integrated collaboration and workflow management tools to deliver customized solutions that improve operational efficiencies and deliver transformative intelligence to users. The service platform is a fully-managed, highly-scalable, secure, cloud-based AI-as-a-service platform designed to automate and simplify the ability of organizations to leverage AI to enhance business processes and gain competitive advantages.

The open source AI software certification process utilities are applicable on many different types of software code. The platform has developed a process to analyze, cleanse and vet open source software. The process automatically analyzes open source AI tools and libraries for rogue, nefarious code and/or malware and viruses. The unique process automatically extracts and compiles the filtered/cleaned software.

Platform talent certification process filters, background checks, and skill tests determine capabilities and apply a mathematical algorithm to derive a platform talent score.

As an example of the platform capabilities, platform bond data extraction extracts key knowledge points using NLP from bond documents. This data may be used to identify credit waterfalls, guarantors, interest rate calculation methods, authorized denominations, bond counsel, bond purpose classes, liquidity facility, DTC eligibility, capital type, bond insurance, call max, compound yield, compound accelerated value, sinking fund redemption frequency, CUSIP, and call price, but is not limited thereto.

As another example of the capabilities, the platform ESG (Environmental, Social, and Governance) score collects environmental, social, and governance data, and applies a proprietary algorithm to calculate an ESG score. The ESG score measures a company's relative ESG performance based on 50 high level criteria segmented in three categories (environmental, social, and governance). The 50 criteria are distilled from thousands of data-points for each company—each data-point is given a numerical value and these values are calculated by applying unique values. These values are then used as inputs in platform algorithms.

In an embodiment, the platform NLP (natural language processing) confidence score is a mathematical methodology to calculate the probability/relative confidence of the accuracy of NLP results extracted from documents. This score is based on leveraging historic/accurate results to train the platform and leverage an algorithm to determine a relative confidence on each answer.

In an embodiment, the platform probability of default score (used in our counterparty risk application) is a unique methodology to compute a firm's expected default frequency (EDF) from items including standard balance sheet line items, stock price, and news, but is not limited thereto. The platform approach is similar to that of Kealhofer, McQuown, and Vasicek (KMV)'s implementation of the Merton (1974) model, however it offers a propriety mapping from firm Distance to Default (DD) to EDF. Instead, and as consistent with Merton, a normal distribution is assumed to transform the computed DD into an EDF.

Under Merton, firm equity (E) is interpreted as a call option of firm value struck against its debt (D). With the platform's methodology, the Black and Scholes (1973) option pricing model is applied. However, in order to correctly apply the Black and Scholes option pricing model, the firm's (unobservable) current value of assets $V\_0$ and volatility of assets $6\_V$ must be specified. The platform has developed a method to estimate these values by simultaneously solving the following system of equations:

With $V\_0$ and $\sigma\_V$ determined, DD is then computed as the Black and Scholes $d\_2$ parameter. The transformation from DD to EDF is then given by $N(\llbracket -d \rrbracket \_2)$, where N denotes the cumulative standard normal distribution. Using regression testing on historic defaults rates, the platform developed a methodology to apply a mathematic model based on delta change stock price and stock volume over time. The platform may provide a "controversial news score" that offers an accurate and dynamically calculated probability of default score (platform PD Score).

The service platform is a human-assisted AI-as-a-service platform that delivers machine learning and deep learning based solutions and industry focused platform software applications from a secure cloud-based platform. The service platform leverages advanced open-source AI tools and libraries, platform certified AI developers, API connected data and microservices, and integrated collaboration and workflow management tools to deliver customized solutions that improve operational efficiencies and deliver transformative intelligence to users. The service platform is a fully-managed, highly-scalable, secure, cloud-based AI-as-a-service platform designed to automate and simplify the ability of organizations to leverage AI to enhance business processes and gain competitive advantages.

The service platform manager is a set of secure web-based management services that provides identity & access management (IAM), cloud resource management, team collaboration, project management, time tracking, source code management, API management and reporting. The service platform manager provides:

Security Administration
User Authentication and Role Based Access Controls
Budget Tracking
API management and Reporting
Project management (includes Jira API integration)
Time tracking
Source code management and version control (includes GitHub API integration)
Team collaboration (includes Slack API Integration)
End-to-end Monitoring & Reporting The platform API gateway is a component of the service platform manager, the API gateway delivers users the ability to quickly create highly scalable REST APIs that connect resources (data and microservices) using a Serverless framework, Django functions, and Jason Web Tokens (JWT). The platform API gateway is a fully managed service that makes it easy for developers to create, publish, maintain, monitor and secure API's at any scale. The cloud infrastructure is built on AWS and the service platform seamlessly integrates Amazon Web Services with the service platform's custom built tools and API connected applications services in order to deliver a secure, fully managed AI-as-a-service platform. The platform's cloud infrastructure services are platform agnostic (i.e., operable on different platforms for example IBM, Microsoft, etc.) as well as and Premise Agnostic (i.e., deployed on premise or in the cloud). AWS cloud infrastructure services leveraged by the service platform:

EC2 Compute
S3 Storage
Amazon Redshift
ElasticSearch
CloudWatch
CloudFormation
SNS (Simple Notification Service)
SQS (Simple Queue Services)

Platform certified developers' portal is a database of 7,000+ platform certified AI developers securely linked to the service platform. Search the platform certified developers_DB to quickly identify qualified developers. Filter by:

Skills
Past Experiences
Education
Language Proficiency
Location
Availability

The platform allows one to invite platform certified developers to collaborate on a project, set budgets, limit billable hours per week, and assign tasks. BYOT (Bring-Your-Own-Talent) provides the ability to add existing corporate resources and project managers to the platform certified developers_DB. Features allow one to track hours, review code and even access work diaries with screenshots of work progress taken every 10 minutes. (See details on Time-Tracking and Jira, GitHub and Slack API Integrations for additional details)

The platform AI Starter Kits are a software containers with 300+ pre-configured, tested, NVD (National Vulnerability Database) scanned machine and deep learning tools and libraries bundled in automatically deployable private docker images. The Starter Kits are designed to streamline the delivery of any AI project. Containers include, but are not limited to Source & Collect, Data Science, Machine Learning, Deep Learning, Translate, OCR, Analyze, Natural Language Processing, Computer Vision, etc.

The data marketplace is a subscription based service that may provide secure API access to more than 300,000 existing datasets.

The platform service platform may make it easy to create, update and automatically publish datasets that can be linked via API to systems, applications or AI development projects. Other features include searching for available datasets by key work or filter by data type, publisher or update frequency, viewing charts and downloading tables to EXCEL. Existing datasets may be available on a subscription basis.

Datasets may be made available on a subscription basis.

The platform may be operated as a whole, or portions may be operated as standalone microservices, such as the data exchange service described below in FIG. 11.

Figure 1:
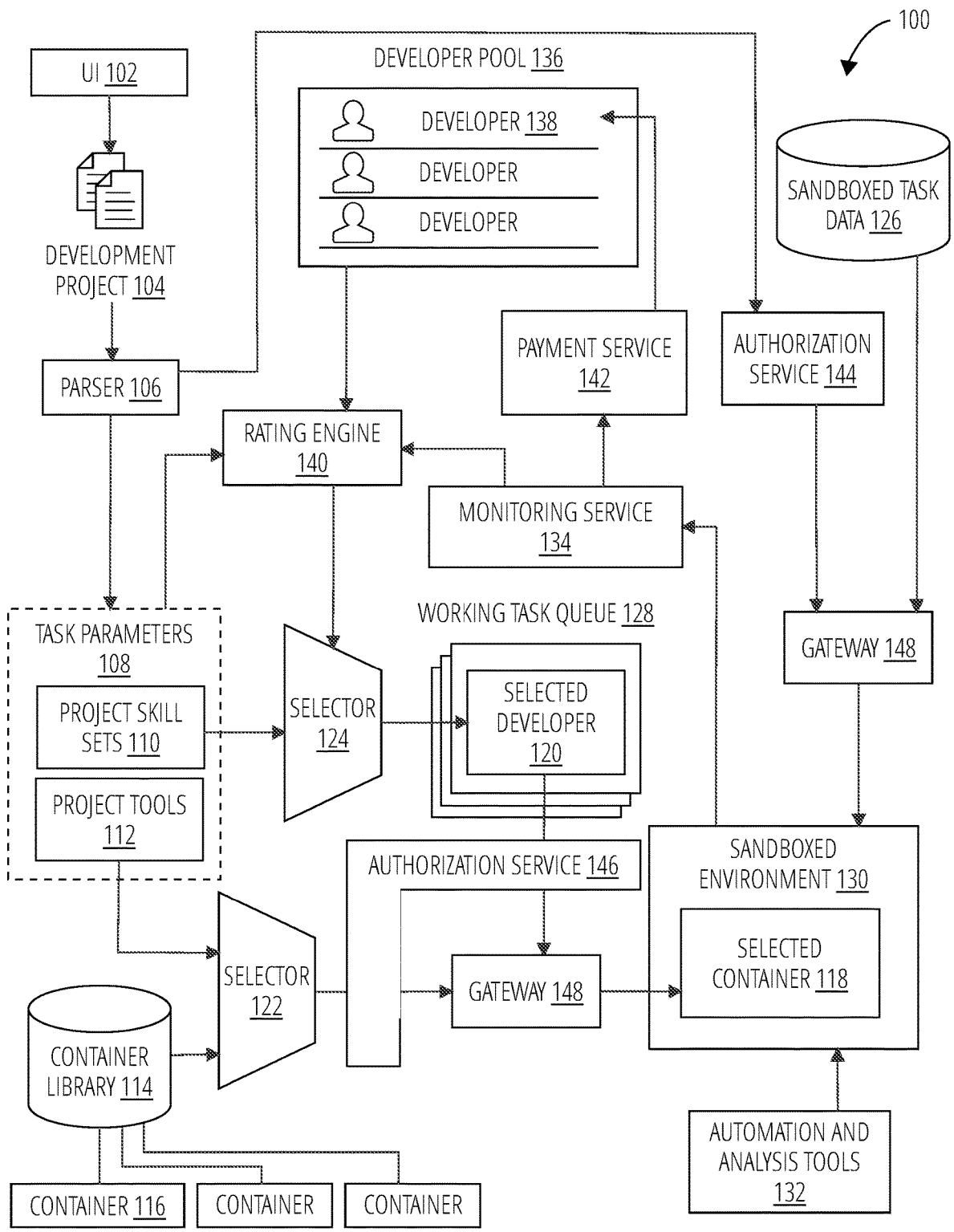
FIG. 1 illustrates a system 100 in accordance with one embodiment.

FIG. 1 illustrates a system 100 for a resource configuration and project management. The system 100 comprises a user interface 102, a parser 106, a container library 114, a first selector 124, a second selector 122, an API gateway 148, a developer pool 136, a working task queue 128, a payment service 142, a rating engine 140, and an authorization service 144. In the system 100, a development project specification 104 for a project is received through a user interface 102. The development project specification 104 includes task parameters 108 and identifies sandboxed task data 126 to be utilized in the project. In some configurations, the task parameters 108 and the sandboxed task data 126 are identified through operation of a parser 106 that extracts the details from the development project specification 104. The task parameters 108 comprise project skill sets 110 and project tools 112. The project skill sets 110 are utilized to configure a first selector 124 for selecting at least one developer 138 for the project from the developer pool 136. The selected developer 120 is added to a working task queue 128.

The project tools 112 are utilized to configure a second selector 122 for selecting an at least one container 116 from the container library 114. The configuration information for the selected at least one container 118 is communicated through the authorization service 146 and an API gateway 148 to allocate computing resources and generate the instance for the selected at least one container 118 creating the sandboxed environment 130. The selected developer 120 in the working task queue 128 is allowed access to the selected at least one container 118 in the sandboxed environment 130 through the authorization service 146 and by passing through the API gateway 148.

While executing the project, the selected developer 120 has access to automation and analysis tools 132 that provide the selected developer 120 with automated actions may include email notifications, alerts, automatically generated reports, risk calculations, confidence scores, extracting data/insights from documents, etc.

The monitoring service 134 monitors sandboxed environment developer resources and sandboxed environment computing resources. The monitoring service may comprise a developer activity tracker, a resource utilization tracker, and a project output evaluator. The monitoring service 134 communicates a payment release control to a payment service 142 in response to detecting the completion of the project.

In some configurations, the first selector 124 receives a ranked developer pool for the project by way of the rating engine 140. The rating engine 140 generates the ranked developer pool from task parameters 108 and the usage logs collected from the monitoring service 134.

In some configurations, the project skill sets 110 for developers may include development skill sets such as, but limited to, chatbots, data analytics, image pre-processing, text mining—sourcing, handwriting recognition, named entity recognition, optical character recognition, natural language processing, text summarization, machine translation, question answering, knowledge extraction, speech-to-text, sentiment analysis, etc.

Figure 2:
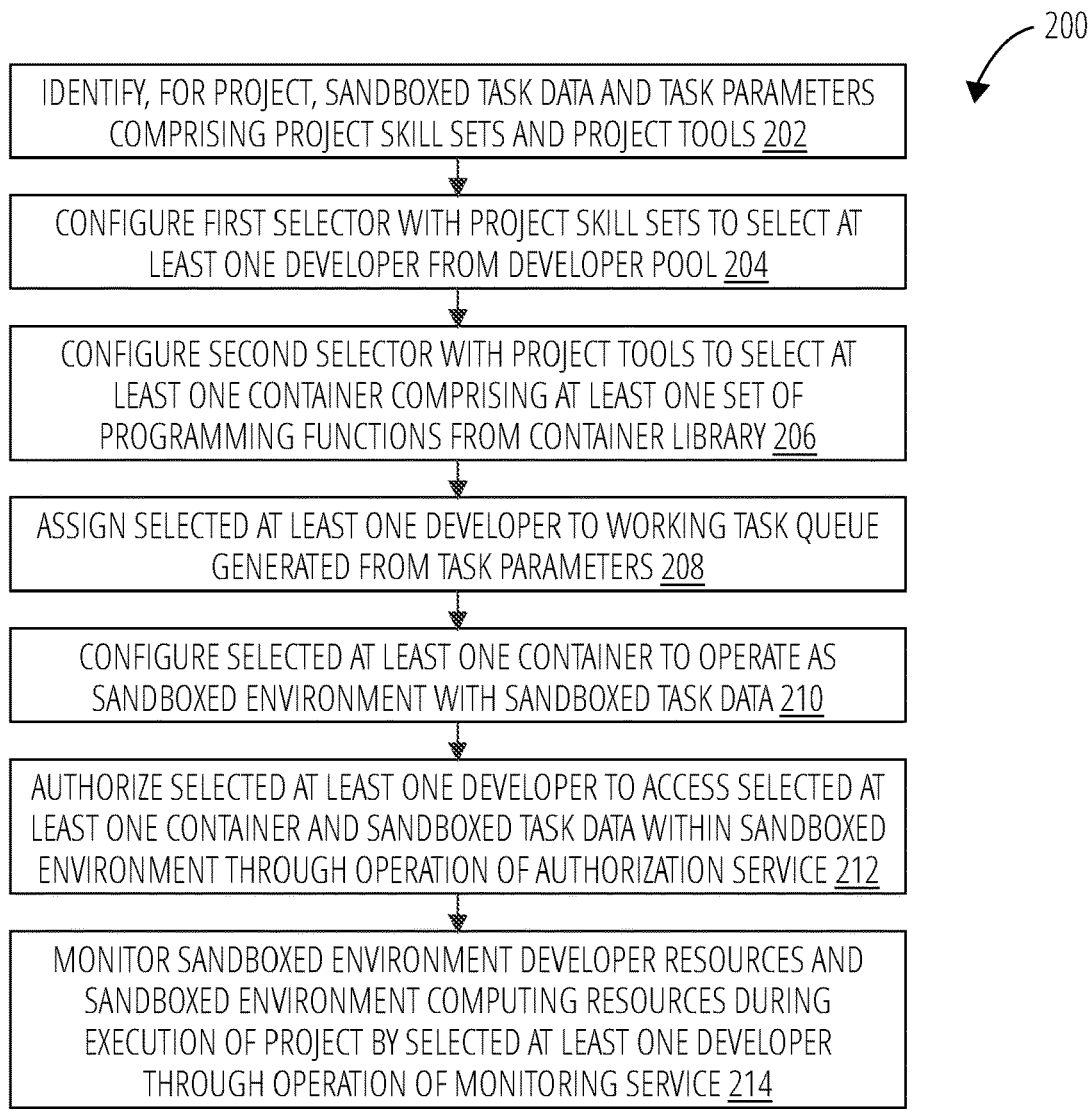

The system 100 may be operated in accordance with the process described in FIG. 2.

FIG. 2 illustrates a method 200 for operating a resource configuration and project management system. In block 202, the method 200 identifies, for a project, sandboxed task data and task parameters comprising project skill sets and project tools. In block 204, the method 200 configures a first selector with the project skill sets to select at least one developer from a developer pool. In block 206, the method 200 configures a second selector with the project tools to select at least one container comprising at least one set of programming functions from a container library. In block 208, the method 200 assigns the selected at least one developer to a working task queue generated from the task parameters. In block 210, the method 200 configures the selected at least one container to operate as a sandboxed environment with the sandboxed task data. In block 212, the method 200 authorizes the selected at least one developer to access the selected at least one container and the sandboxed task data within the sandboxed environment through operation of an authorization service. In block 214, the method 200 monitors sandboxed environment developer resources and sandboxed environment computing resources during execution of the project by the selected at least one developer through operation of a monitoring service.

In FIG. 3, a system 300 for resource configuration and project management illustrates operations of the monitoring service 134. The system 300 comprises a first selector 124, a rating engine 140, a payment service 142, a monitoring service 134, a developer pool 136, and a sandboxed environment 302. The monitoring service 134 comprises a developer activity tracker 310, a project output evaluator 324, and a resource utilization tracker 312. The monitoring service 134 monitors the sandboxed environment 302 comprising an active container 306 with an active development project 304 and the sandboxed data 308. The developer activity tracker 310 monitors sandboxed environment developer resources such as developer activity status (e.g., active, idle, typing, etc.) through a status tracker 316 and periodically takes screen captures 314 of the developer's user interface. The resource utilization tracker 312 monitors sandboxed environment computing resources, (e.g., memory, storage, processing resources, etc.). The resource utilization tracker 312 may be utilized to correlate computing resources utilized during a project to an expense report.

In some configurations, the developer activity tracker 310 may be a secure brow ser-based client based on a JIRA plugin that provides developers, invited from the developer pool or an organization's private TalentHub, to automatically upload project specific timesheets and worklogs. The developer activity tracker 310 provides the ability to access work diaries with screenshots of work progress taken, for example, every 10 minutes.

The project output evaluator 324 receives an indication when a project or portion of a project is completed and may compare the completed project to the development project specification 104. In some configurations, the project output evaluator 324 may monitor the progress of the project and identify when the project or portion of a project is completed without receiving confirmation from a developer. When the project output evaluator 324 identifies the completion of the project or portion of the project, the monitoring service 134 releases a payment release control 328 to a payment service 142. The payment service 142 may be payment processing services that hold funds associated with a project and release the funds to the developer bank account 320 in response to the payment release control 328. The value of the funds may be configured by the development project specification 104 as well as any terms regarding partial completion of the project and payment schedules.

The monitoring service 134 generates usage logs 326 comprising the sandboxed environment developer resources and the sandboxed environment computing resources for a project. The usage logs 326 are communicated to the rating engine 140 to generate a ranked developer pool 330. The rating engine 140 comprises a scoring function 318 and correlator 322. The correlator 322 correlates the usage logs 326 to developers in the developer pool 136. The scoring function 318 generates a developer score from the usage logs 326 and the task parameters 108 for the project. In some configurations, the developer score identifies whether a particular developer is suited for a project based on their previous projects and the current task parameters for a new project in addition to the project skill sets sought for the project.

The system 300 may be operated in accordance with the process described in FIG. 2 and FIG. 4.

FIG. 4 illustrates a method 400 for operating a resource configuration and project management system. In block 402, the method 400 ranks developers in the developer pool through operation of a rating engine configured by the task parameters and usage logs from the monitoring service. The usage logs comprise the sandboxed environment developer resources and the sandboxed environment computing resources collected by the monitoring service. In block 404, the method 400 operates the first selector to select the at least one developer from a ranked developer pool by way of the rating engine.

FIG. 5 illustrates a system 500 in accordance with one embodiment. In the system 500, a development project specification 512 comprising task parameters 518 undergoes an authentication service 514 process before being communicated to a gateway 510. The gateway 510 may be configured with the task parameters 518 of the development project specification 512 to retrieve functions and/or microservices from a container 502. For example, the container 502 may include microservice 504 and microservice 506 that may be made available to a developer 520 to utilize through an application program interface API 516. The authentication service 514 may communicate information for allocating computing resources for the container 502 as a sandboxed environment 522.

FIG. 6 illustrates a system 600 in accordance with one embodiment. In the system 600, the development project specification 512 comprising task parameters 518 undergoes the authentication service 514 process before being communicated to the gateway 510. The gateway 510 may then be configured with the task parameters 518 of the development project specification 512 to retrieve microservice 504 and microservice 506 from the container 502. The task parameters 518 may also configure the gateway 510 to pull project data 604 to provide to the microservice 506 and microservice 504. The microservice 506 and the microservice 504 may be provided with sandboxed data 606 related to the development project specification 512. The operations of the microservice 504 and the microservice 506 within the container 502 operate in a sandboxed environment 522 accessible by the developer 520 through the API 516. A completed project 602 may be generated through the operation of the microservice 506 and the microservice 504.

The completed project 602 may be utilized by a machine learning algorithm 608 of a monitoring service 610. The machine learning algorithm 608 may generate container recommendations to configure the second selector 612 to select functional containers to be utilized by the project, wherein the machine learning algorithm utilizes the task parameters, previous completed projects, and usage logs to generate the container recommendations. In some configurations, the machine learning algorithm 608 may be utilized to reorganize containers in the container library 508 to improve the collection of functions and microservices associated with a particular set of requirements. For instance, depending on the completed project 602 for the task parameters 518 of the development project specification 512, the machine learning algorithm 608 may provide or modify the microservices in the container 502 provided to the developer 520 to complete their task in the future.

The machine learning algorithm 608 may incorporate aspects of a basic deep neural network 700 and artificial neuron 800 described below.

In FIG. 7, a basic deep neural network 700 is based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 702), to the last layer (the output layer 706), possibly after traversing one or more intermediate layers, called hidden layers 704.

Referring to FIG. 8, an artificial neuron 800 receiving inputs from predecessor neurons consists of the following components:

inputs $x_i$;

weights $w_i$ applied to the inputs;

an optional threshold (b), which stays fixed unless changed by a learning function; and an activation function 802 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 802 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Referencing FIG. 9, an operating system OS container 900 comprises an at least one functional container 904 each comprising at least one function 902. The OS container 900 may provide collection of related functional containers utilized in performing a specific task. The OS container 900 provides at least one functional container 904 as a collection of AI related functions. The at least one functional container 904 may be similar to a software library that serves as a collection of non-volatile resources used by computer programs, often for software development. These may include, but are not limited to, configuration data, documentation, help data, message templates, pre-written code and subroutines, classes, values or type specifications.

FIG. 10 illustrates a high-level architecture 1000 of a platform operating the resource configuration and management system. The high-level architecture 1000 includes a front end 1002, transport access control 1012, services 1018, developers portal 1026, AI functions and data 1030, and storage 1038. The front end 1002 comprises data provider 1004, data subscribers 1006, platform software applications 1008, and platform talent 1010. The platform software applications 1008 comprise application interfaces for tools to perform tasks such as counter party risk assessment, ETF tracking, and bond analysis, as well as tools such as text analysis tool, taxonomy tool, project management tool, and ESG analysis, but is not limited thereto. The transport access control 1012 includes an identity and access control layer 1014 and an API gateway 1016. The identity and access control layer 1014 may offer access control functionality to services related to client access management and admin, monitoring, reporting, metering, billing, SSO, compliance, audit (auth0), etc. The API gateway 1016 may offer or provide robust and secure serverless framework that may include features for allowing REST API, Django functions, JSON web tokens (JWT). The services 1018 provide integration with software as a service 1020, data as a service 1022, and AI as a service 1024. In some configurations, the AI as a service 1024 may include work flow management, platform certified developers, time tracker & work diary services, cloud resource manager services (e.g., AWS), project management services (e.g., JIRA), code management services (e.g., Github), and collaboration services (e.g., Slack). The developers portal 1026 may include a platform talent tub 1028. The AI functions and data 1030 may include AI algorithms 1036, Datasets 1034, and AI containers 1032. The AI algorithms 1036 may include API accessible AI algorithms. The AI containers 1032 may include platform deep software—containers for performing functions such as source & collect, store & search, protect & encrypt, OCR, transform & translate, natural language processing, computer vision, analyze, and visualization. The storage 1038 may include data lake 1040 comprising, for example, billions of data points for training the AI algorithms.

FIG. 11 illustrates a platform architecture 1100 of the resource configuration and management system. The platform architecture 1100 comprises a virtual private cloud 1102 monitored by a developer activity tracker 1104 and an annotation service 1106. The virtual private cloud 1102 comprises a platform front end 1112, an application load balancer 1110 that communicates to a client subdomain 1114, relational database services 1118, microservices 1134, a message broker 1152, a task processing service 1150 and a API interface for third party services 1108. The relational database services 1118 communicate with the microservices 1134 and the task processing service 1150. the microservices 1134 communicates with the message broker 1152 and the relational database services 1118. The task processing service 1150 communicates with the message broker 1152 and the relational database services 1118. The third party services 1108 communicates with the platform front end 1112. The platform front end 1112 communicates with the third party services 1108, the relational database services 1118, the microservices 1134, and the task processing service 1150. The platform front end 1112 communicates with the client subdomain 1114 through the application load balancer 1110.

The virtual private cloud 1102 also includes an SSL certificate 1116. The relational database services 1118 comprise data utilized by the microservices 1134. The microservices 1134 include an authorization service 1136, projects service 1138, subscription service 1140, a computing resources service 1142, a developer pool service 1144, a data exchange service 1146, and an API gateway 1148. The relational database services 1118 comprise relation databases for an authorization service 1120, project service 1122, computing resources service 1124, subscription service 1126, developer pool service 1130, API gateway 1128, and data exchange service 1132. The microservices 1134 may have access to automation and analysis tools such as Bots+ algorithms 1154, AI applications 1156, and starter kits 1158. The Bots+algorithms 1154 may include document intelligence, Natural Language Processing (NLP), Computer Vision algorithms, and Custom Industry Specific Bots (e.g., scrapers, web crawler, etc.). The AI applications 1156 may include preconfigured applications for natural language processing, computer vision, and sourcing and data collecting (i.e., scrapping). The starter kits 1158 may include preconfigured applications and manuals for data science, machine learning, deep learning, and sourcing and data collection (scrapping).

The data exchange service 1146 may be operated as a whole, or as a standalone microservice that provides users the ability to programmatically search, access, subscribe to, and link core, alternative or training datasets. Each standalone service may require an application for managing the users in an organization, such as Q-Auth.

The subscription service 1140 may be operated to create, manage, update and automatically publish subscription-based datasets that can be linked via API to systems, applications or AI development projects. The subscription service 1140 may allow for the management of user subscriptions, set and track API calls, and with an integrated Payment Gateway quickly create, publish and monetize data assets.

In some configurations, the platform front end 1112 may run instances of Ubuntu OS, Angular, NodeJS (Web Server—Nginx) on t3.medium with 2 vCPUs, 4 GB of Memory, 150 GB Storage.

In some configurations, the microservices 1134 may operate as the backend for the platform. The backend of the platform may run instances of API gateway Service Instance, Ubuntu OS, Django (Web Server—Nginx) on m5.xlarge with 4 vCPUs, 8 GB of Memory, 150 GB Storage.

In some configurations, the virtual private cloud 1102 may run background instances of Ubuntu OS, Django, Celery, SendGrid, Sentry (Web Server—Nginx) on m5.xlarge with 4 vCPUs, 8 GB of Memory, 150 GB Storage.

In some configurations, the relational database services 1118 may operate on db.t3.medium with 2 vCPUs, 4 GB of Memory, 30 GB Storage Single RDS instance running PostgreSQL with seven databases: authorization service, computing resources service, data exchange service, API gateway, project services, subscription services, and developer pool services.

In some configurations, the third party services 1108 may include, but are not limited to, AWS (computer resources), Jira (project management), Slack (group communications), Github (source code management), Sendgrid (email messaging), Stripe (payments gateway).

In some configurations, the message broker 1152 may be a ElastiCache—Redis Service operating on cache.m4.large, vCPU: 2, Memory: 6.42 GB.

FIG. 12 illustrates a workflow 1200 in accordance with one embodiment. The workflow 1200 may involve web querying platform software applications (block 1202). In block 1204, the workflow 1200 involves document acquisition. Once block 1204 completes, the documents are targeted for storage in object storage in a web service interface (e.g., Amazon Web Services Simple Storage Service—AWS S3) (block 1206). Following block 1206, the object based storage stores and protects the documents (block 1208). The stored documents are then transferred to a document indexing app in block 1210. In block 1212, the document indexing app translates and transforms the document content. Examples of transformation include, the transformation of a PDF document to machine readable text, formatted content. Additionally, the translation of multiple languages to a selected single language may be performed. The translated and transformed document content is then sent to a text analysis tool 1234 that performs text and document analysis in block 1214. In block 1216, a taxonomy tool 1236 identifies industry taxonomies and ontologies. In block 1218, the output of the taxonomy tool 1236 may be handed off to document/text processing algorithms. In block 1220, the output from block 1218 goes through NLP rules, built using machine and deep learning based methods. The output from block 1220 may then undergo results validation 1232 using taxonomy tool in block 1222. The output of block 1222 may be utilized by API connected data documents in object based storage in block 1224 where the results are run at scale 1238. The output of block 1224 is then handed off to the ESG reporting framework 1230 the performs ESG weighting in block 1226. The output from block 1226 is then handed off to the ESG reporting dashboard in block 1228.

FIG. 13 illustrates one example of a system architecture and data processing device that may be used to implement one or more illustrative aspects described herein in a stand-alone and/or networked environment. Various network nodes data server 1310, web server 1306, computer 1304 (i.e., computing apparatus), and laptop 1302 may be interconnected via a wide area network 1308 (WAN), such as the internet. Other networks may also or alternatively be used, including private intranets, corporate networks, LANs, metropolitan area networks (MANs) wireless networks, personal networks (PANs), and the like. Network 1308 is for illustration purposes and may be replaced with fewer or additional computer networks. A local area network (LAN) may have one or more of any known LAN topology and may use one or more of a variety of different protocols, such as ethernet. Devices data server 1310, web server 1306, computer 1304, laptop 1302 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1310, web server 1306, and client computer 1304, laptop 1302. Data server 1310 provides overall access, control and administration of databases and control software for performing one or more illustrative aspects described herein. Data server data server 1310 may be connected to web server 1306 through which users interact with and obtain data as requested. Alternatively, data server 1310 may act as a web server itself and be directly connected to the internet. Data server 1310 may be connected to web server 1306 through the network 1308 (e.g., the internet), via direct or indirect connection, or via some other network. Users may interact with the data server 1310 using remote computer 1304, laptop 1302, e.g., using a web browser to connect to the data server 1310 via one or more externally exposed web sites hosted by web server 1306. Client computer 1304, laptop 1302 may be used in concert with data server 1310 to access data stored therein, or may be used for other purposes. For example, from client computer 1304, a user may access web server 1306 using an internet browser, as is known in the art, or by executing a software application that communicates with web server 1306 and/or data server 1310 over a computer network (such as the internet).

Servers and applications may be combined on the same physical machines, and retain separate virtual or logical addresses, or may reside on separate physical machines. FIG. 13 illustrates just one example of a network architecture that may be used, and those of skill in the art will appreciate that the specific network architecture and data processing devices used may vary, and are secondary to the functionality that they provide, as further described herein. For example, services provided by web server 1306 and data server 1310 may be combined on a single server.

Each component data server 1310, web server 1306, computer 1304, laptop 1302 may be any type of known computer, server, or data processing device. Data server 1310, e.g., may include a processor 1312 controlling overall operation of the data server 1310. Data server 1310 may further include RAM 1316, ROM 1318, network interface 1314, input/output interfaces 1320 (e.g., keyboard, mouse, display, printer, etc.), and memory 1322. Input/output interfaces 1320 may include a variety of interface units and drives for reading, writing, displaying, and/or printing data or files. Memory 1322 may further store operating system software 1324 for controlling overall operation of the data server 1310, control logic 1326 for instructing data server 1310 to perform aspects described herein, and other application software 1328 providing secondary, support, and/or other functionality which may or may not be used in conjunction with aspects described herein. The control logic may also be referred to herein as the data server software control logic 1326. Functionality of the data server software may refer to operations or decisions made automatically based on rules coded into the control logic, made manually by a user providing input into the system, and/or a combination of automatic processing based on user input (e.g., queries, data updates, etc.).

Memory 1322 may also store data used in performance of one or more aspects described herein, including a first database 1332 and a second database 1330. In some embodiments, the first database may include the second database (e.g., as a separate table, report, etc.). That is, the information can be stored in a single database, or separated into different logical, virtual, or physical databases, depending on system design. Web server 1306, computer 1304, laptop 1302 may have similar or different architecture as described with respect to data server 1310. Those of skill in the art will appreciate that the functionality of data server 1310 (or web server 1306, computer 1304, laptop 1302) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of operating a resource configuration and project management system, the method comprising:
identifying, for a project, sandboxed task data and task parameters comprising project skill sets and project tools;
configuring a first selector with the project skill sets to select at least one developer from a developer pool;
configuring a second selector with the project tools to select at least one container comprising at least one set of programming functions from a container library;
assigning the selected at least one developer to a working task queue generated from the task parameters;
configuring the selected at least one container to operate as a sandboxed environment with the sandboxed task data;
authorizing the selected at least one developer to access the selected at least one container and the sandboxed task data within the sandboxed environment through operation of an authorization service;
monitoring sandboxed environment developer resources and sandboxed environment computing resources during execution of the project by the selected at least one developer through operation of a monitoring service;
wherein the monitoring service comprises a machine learning algorithm; and
wherein the machine learning algorithm generates container recommendations to configure the second selector to select at least one functional container to be utilized by the project, wherein the machine learning algorithm utilize the task parameters, previous completed projects, and usage logs to generate the container recommendations.

2. The method of claim 1, wherein the monitoring service comprises a developer activity tracker, a resource utilization tracker, and a project output evaluator.

3. The method of claim 2, wherein the developer activity tracker periodically collects screen captures of the at least one developer's user interface as part of monitoring the sandboxed environment developer resources.

4. The method of claim 2, wherein the resource utilization tracker monitors the sandboxed environment computing resources of the selected at least one container.

5. The method of claim 2, wherein the project output evaluator communicates a payment release control to a payment service in response to detecting a completed project.

6. The method of claim 1 further comprising:
ranking developers in the developer pool through operation of a rating engine configured by the task parameters and the usage logs from the monitoring service, wherein the usage logs comprise the sandboxed environment developer resources and the sandboxed environment computing resources collected by the monitoring service; and
operating the first selector to select the at least one developer from a ranked developer pool by way of the rating engine.

7. The method of claim 6, wherein the rating engine comprises a correlator for relating the usage logs to corresponding developers and a scoring function to generate a developer score from the usage logs for the project.

8. The method of claim 1, wherein the at least one container is an operating system container comprising the at least one functional container comprising the at least one set of programming functions.

9. The method of claim 1, wherein the selected at least one developer accesses the selected at least one container through an API gateway.

10. The method of claim 1, wherein the authorization service is configured to allocate computing resources for the selected at least one container through an API gateway.

11. The method of claim 1, wherein the sandboxed task data and the task parameters are identified from a development project specification through operation of a parser.

12. The method of claim 11, wherein the development project specification is received through a user interface.

13. The method of claim 1, wherein the machine learning algorithm is a deep learning neural network.

14. The method of claim 1, wherein the selected at least one developer has access to automation and analysis tools for use within the sandboxed environment.

15. A computing apparatus, the computing apparatus comprising:
a processor; and
a memory storing instructions that, when executed by the processor, configure the apparatus to:
identify, for a project, sandboxed task data and task parameters comprising project skill sets and project tools;
configure a first selector with the project skill sets to select at least one developer from a developer pool;
configure a second selector with the project tools to select at least one container comprising at least one set of programming functions from a container library;
assign the selected at least one developer to a working task queue generated from the task parameters;
configure the selected at least one container to operate as a sandboxed environment with the sandboxed task data;
authorize the selected at least one developer to access the selected at least one container and the sandboxed task data within the sandboxed environment through operation of an authorization service;
monitor sandboxed environment developer resources and sandboxed environment computing resources during execution of the project by the selected at least one developer through operation of a monitoring service;
wherein the monitoring service comprises a machine learning algorithm; and
wherein the machine learning algorithm generates container recommendations to configure the second selector to select at functional containers to be utilized by the project, wherein the machine learning algorithm utilize the task parameters, previous completed projects, and usage logs to generate the container recommendations.

16. The computing apparatus of claim 15, the instructions further configuring the apparatus to:
rank developers in the developer pool through operation of a rating engine configured by the task parameters and the usage logs from the monitoring service, wherein the usage logs comprise the sandboxed environment developer resources and the sandboxed environment computing resources collected by the monitoring service; and
operate the first selector to select the at least one developer from a ranked developer pool by way of the rating engine.

17. A non-transitory computer-readable storage medium, the computer-readable storage medium including instructions that when executed by a computer, cause the computer to:
identify, for a project, sandboxed task data and task parameters comprising project skill sets and project tools;
configure a first selector with the project skill sets to select at least one developer from a developer pool;
configure a second selector with the project tools to select at least one container comprising at least one set of programming functions from a container library;
assign the selected at least one developer to a working task queue generated from the task parameters;
configure the selected at least one container to operate as a sandboxed environment with the sandboxed task data;
authorize the selected at least one developer to access the selected at least one container and the sandboxed task data within the sandboxed environment through operation of an authorization service;
monitor sandboxed environment developer resources and sandboxed environment computing resources during execution of the project by the selected at least one developer through operation of a monitoring service;
wherein the monitoring service comprises a machine learning algorithm; and
wherein the machine learning algorithm generates container recommendations to configure the second selector to select at functional containers to be utilized by the project, wherein the machine learning algorithm utilize the task parameters, previous completed projects, and usage logs to generate the container recommendations.

18. The non-transitory computer-readable storage medium of claim 17, the instructions further configuring the computer to:
rank developers in the developer pool through operation of a rating engine configured by the task parameters and the usage logs from the monitoring service, wherein the usage logs comprise the sandboxed environment developer resources and the sandboxed environment computing resources collected by the monitoring service; and
operate the first selector to select the at least one developer from a ranked developer pool by way of the rating engine.

* * * * *